3,798,192
POLYTHIOL BASED SEALANTS
Joseph R. Kenton, Bartlesville, Okla., assignor to
Phillips Petroleum Company
No Drawing. Filed Nov. 17, 1971, Ser. No. 199,718
Int. Cl. C08g 43/02, 47/10
U.S. Cl. 260—29.2 M              21 Claims

ABSTRACT OF THE DISCLOSURE

The adhesive characteristics of cured sealant formulations based on polythiol polymers are substantially improved by the incorporation into the uncured sealant formulation of at least one glycidyl trialkyloxysilane which has been at least partially hydrolyzed prior to such incorporation. The use of the hydrolyzed glycidyl trialkyloxysilane enhances the adhesion quality of the cured sealant over that achieved by the incorporation of the same amount of glycidyl trialkyloxysilane into the polythiol. Water or ethylene glycol can also be incorporated into the polythiol to further improve the properties of the sealant.

BACKGROUND OF THE INVENTION

This invention relates to a method for improving the properties of a polythiol sealant formulation and the resulting product. In accordance with one aspect, this invention relates to processes for bonding liquid curable polythiol compound based sealant compositions to structural element substrates. In accordance with another aspect the invention relates to the incorporation into a polythiol sealant composition of at least one previously hydrolyzed glycidyl trialkyloxysilane to improve the adhesion of the subsequently cured formulation. In a further aspect the invention relates to the addition of ethylene glycol or water to uncured polythiol polymers to render such polymers suitable for application in vertical joints.

Sealing compositions that can be applied by one of various means, e.g., hand trowel or extrusion guns, to gaps between component parts of buildings and aircraft, for example, and shaped to conform to the surfaces of the joints, are used in large quantities in the building and engineering industries. Among the sealing compositions available to those industries are compositions that undergo a chemical change after being used to fill a joint such that there results a rubbery seal resistant to oil and gasoline and the weather. One type of sealing composition that undergoes such a chemical change and is at present available is supplied in two parts that are mixed together shortly before use, one of the parts comprising liquid curable polythiol polymer and the other a curing agent for the polymer. However, cured polysulfide polymer based sealants do not readily adhere to the wide range of surfaces against which it is desired to bring it into contact for joint sealing purposes. The adhesive qualities of polysulfide polymers are such as to usually require the use of an adhesion-promoting additive in the uncured polythiol based sealant composition in order to ensure a good bonding of the cured sealant to the substrate.

It is known that glycidyl trialkyloxysilanes are excellent adhesion-promoting additives for curable liquid polythiol based sealant and caulking compositions whereby cured polysulfide polymer based sealants having extremely high peel strength are obtained. I have now discovered that significant unexpected improvements in the adhesive quality of the sealant formulation can be achieved if the glycidyl trialkyloxysilane is at least partially hydrolyzed prior to the incorporation of the silane into the polythiol polymer. I have also discovered that the employment of water and/or ethylene glycol in the sealant formulation significantly increases the suitability of the sealant formulation for use in vertical joints.

Accordingly, an object of this invention is to provide a novel liquid curable polythiol based caulking or sealant composition which will allow for the attainment of a strong and lasting bonding of the cured sealant to substrates to be treated therewith.

Another object of this invention is to provide a process whereby curable liquid polythiol based sealant and caulking compositions can be used so as to attain a strong and lasting bond of the cured polysulfide polymer containing compositions to substrates treated therewith.

A further object of this invention is to provide an adhesion-promoting additive for curable liquid polythiol compound based sealants which increases the peel strength for the sealant-to-substrate bond.

Yet another object of the invention is to reduce the amount of adhesion-promoting silane additive required to be incorporated into the sealant formulation in order to achieve the desired high peel strength. A further object of the invention is to improve the dimensional stability of the uncured polymer during the curing period.

Other objects, aspects and advantages of the invention will be apparent from a study of the specification and the appended claims to the invention.

SUMMARY OF THE INVENTION

In accordance with the invention, at least one glycidyl trialkyloxysilane is at least partially hydrolyzed and the resulting material is then incorporated into a curable liquid polythiol compound based sealant and caulking compositions to improve the adhesive characteristics of these compositions upon subjecting same to curing.

In accordance with a presently preferred specific embodiment of the invention the at least partially hydrolyzed glycidyl trialkyloxysilanes are added to poly(oxyalkylene)-polyester-poly(monosulfide)-polythiols having at least three pendent thiol groups per molecule, which compounds are formed by reacting a mercaptoalkanoic acid and, optionally, also a thiodialkanoic acid with a poly (oxyalkylene)-polyol having at least three pendent hydroxy groups per molecule.

DESCRIPTION OF THE PREFERRED EMBODIMENT

The glycidyl trialkyloxysilanes which can be employed to form the at least partially hydrolyzed adhesion promoters of the present invention can be represented as follows:

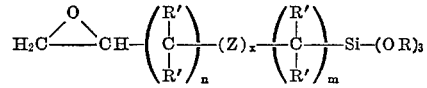

wherein Z is oxygen or sulfur; wherein $n$ is an integer in the range of 1 to 5; wherein $m$ is an integer in the range of 1 to 5; wherein $x$ is in the range of 0 to 1; wherein R' is hydrogen or alkyl having in the range of 1 to 5 carbon atoms, wherein the total carbon atoms in all R' groups per molecule is equal to or less than 10; and wherein R is alkyl having in the range of 1 to 5 carbon atoms.

Illustrative glycidyl trialkyloxysilanes falling within the scope of the formula defined above include gamma-glycidoxypropyltrimethoxysilane,
glycidoxymethyltrimethoxysilane,
glycidylthiomethyltrimethoxysilane,
gamma-ethyl-delta-(3,ethyl-4-glycidyl-2,2,3-trimethyl-
  nonyloxymethyl)-beta,beta,gamma-trimethyl-
  nonyl-tripentyloxysilane,
gamma-ethyl-delta-(3-ethyl-4-glycidyl-2,2,3-trimethyl-
  nonylthiomethyl)-beta,beta,gamma-trimethyl-
  nonyltripentyloxysilane,
gamma-glycidylthiopropyltrimethoxysilane, and the like, and admixtures thereof.

The glycidyl trialkyloxysilanes can be at least partially hydrolyzed in accordance with the present invention by being brought into intimate contact with water, preferably with vigorous agitation, for a period of time sufficient to obtain a homogeneous mixture. In general, at least one-third, and preferably at least about two-thirds of the alkyloxy groups in the silane are hydrolyzed, i.e., converted to —OH groups. The molar ratio of water to silane will generally be at least 1:1, preferably at least 1.5:1, and more preferably in the range of about 1.5:1 to about 2:1. The resulting reaction effluent, which contains the alcohol by-products of the hydrolysis reaction, can be employed as the adhesion promoter without purification thereof, or the reaction effluent can be subjected to conventional separational processes to recover the at least partially hydrolyzed silane in a purified form for use as the adhesion promoter. The at least partially hydrolyzed silanes of the present invention can be represented as follows:

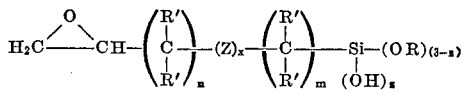

wherein Z is oxygen or sulfur; wherein $n$ is an integer in the range of 1 to 5; wherein $m$ is an integer in the range of 1 to 5; wherein $x$ is in the range of 0 to 1; wherein R' is hydrogen or alkyl having in the range of 1 to 5 carbon atoms, and wherein the total carbon atoms in all R' groups per molecule is equal to or less than 10; wherein R is alkyl having in the range of 1 to 5 carbon atoms; and wherein z is, on a statistical basis, a number in the range of 1.0 to 3.0, and more preferably having a value of at least 1.5, even more preferably having a value of about 2.0.

The adhesion-promoting additive of the present invention, i.e., the at least partially hydrolyzed glycidyl trialkyloxysilane, can be incorporated into any of the known polythiol compounds which are normally used to prepare polysulfide based sealants or caulking compositions. The amount of the adhesion-promoting additive of the present invention employed will generally be in the range of about 0.1 to about 10 parts, more preferably about 0.2 to about 6 parts by weight of the at least partially hydrolyzed silane compound per 100 parts by weight of the polythiol polymer. The polythiol polymers are liquid organic molecules having in the range of about 2 to about 40 thiol groups per molecule which are generally known to form polysulfide polymers upon curing. Preparation of suitable polysulfide polymers from polythiol compounds and use in sealants is well known in the art, and is set forth in U.S. Pats. 3,297,473 and 3,312,669.

The invention is particularly applicable to improving the adhesive characteristics of sealants based on curable poly(oxalkylene)-polyester-poly(monosulfide) - polythiols having at least three pendent thiol groups per molecule which are formed by reacting a mercaptoalkanoic acid and a thiodialkanoic acid with a poly(oxyalkylene)-polyol having at least three pendent hydroxy groups per molecule.

The mercaptoalkanoic acids which can be employed are represented as follows:

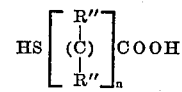

wherein R" is H or alkyl having in the range of 1 to 5 carbon atoms, with a total of no more than 10 carbon atoms in all R" groups per molecule; and wherein $n$ is an integer in the range of 1 to 5.

Illustrative examples of mercaptoalkanoic acids or mercaptohydrocarboncarboxylic acids that can be employed according to the invention include 2-mercaptoethanoic acid,
3-mercaptopropionic acid,
4-mercaptobutyric acid,
6-mercaptohexanoic acid,
6-mercaptoundecanoic acid,
6-mercapto-6-(2,2-dimethylpropyl)undecanoic acid,
6-mercapto-2-(2,2-dimethylpropyl)undecanoic acid,
2-mercapto-2-methylheptanoic acid,
3,3-dimethyl-6-mercaptohexanoic acid,
6-mercapto-2,2,3,3,4,4,5,5,6-nonamethylheptanoic acid, and the like and admixtures thereof.

The thiodialkanoic acids which can be employed are represented as follows:

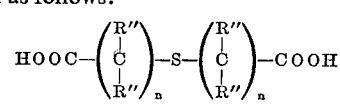

wherein R" is as defined above, and each $n$ is individually selected from the group of integers in the range of 1 to 5, with a total of no more than 20 carbon atoms in all R" groups per molecule.

Representative examples of such thiodialkanoic acids that can be employed according to the invention include thiodipropionic acid [3-(2-carboxyethylthio)propanoic acid],
carboxymethylthioethanoic acid,
4-(3-carboxypropylthio)butanoic acid,
6-(5-carboxypentylthio)hexanoic acid,
6-[1-(4-carboxybutyl)hexylthio]undecanoic acid,
6-[1-(4-carboxybutyl)-1-(2,2-dimethylpropyl)hexyl-
  thio]-6-[2,2-dimethylpropyl]undecanoic acid,
6-(5-carboxy-7,7-dimethyloctylthio)-2-(2,2-dimethyl-
  propyl)hexanoic acid,
2-(1-carboxy-1-methylhexylthio)-2-methylheptanoic
  acid,
6-(5-carboxy-4,4-dimethylpentylthio)-3,3-dimethyl-
  hexanoic acid,
6-(5-carboxy-1,1,2,2,3,3,4,4,5-nonamethylhexylthio)-
  2,2,3,3,4,4,5,6-nonamethylheptanoic acid, and the like, and admixtures thereof.

The poly(oxyalkylene)-polyols employed have at least three pendent hydroxy groups per molecule. Such polyhydroxy polyethers or poly(oxyalkylene)-polyols preferably have 3 to about 12 hydroxy groups per molecule and molecular weights of from about 200 to about 20,000. These materials can be produced by the reaction of one or more epoxy-substituted hydrocarbons of the general formulas:

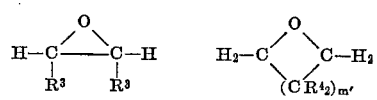

with a polyol of the general formula:

wherein either $R^3$ can be H or alkyl with the total number of carbon atoms in the molecule being in the range of up to and including about 20; wherein $R^4$ can be alkyl or H with the total number of carbon atoms per molecule being in the range of up to and including about 20; and wherein $m'$ can be an integer of from 1 to about 10, preferably 1 to 3; and wherein A can be a hydrocarbon moiety with 3 to 40 carbon atoms per moiety and a valence equal to the value of $x'$, $x'$ is an integer from 3 to about 20, and the number of carbon atoms per molecule of $A(OH)_{x'}$ is equal to or greater than $x'$.

Polyols that can be employed in the preparation of the poly(oxyalkylene) - polyols or polyhydroxy polyethers comprise hydroxy-substituted hydrocarbons that are preferably saturated aliphatics, saturated cycloaliphatics, aryls, or combinations thereof that are substituted with at least three hydroxyl groups per molecule. In the presently preferred embodiment, these polyols, $A(OH)_{x'}$, can have up to about 12 hydroxyl groups per molecule, and can contain from 3 to about 20 carbon atoms per molecule. Illustrative of the polyols that can be represented by the general formula, $A(OH)_{x'}$, are glycerine, pentaerythritol, erythritol, 1,3,8-trihydroxycyclododecane, estriol, 1,4,5,8-naphthalenetetrol, di(p - hydroxyphenyl)phenylmethanol, 1,2,6-hexanetriol, 1,2,4,6,7,9,12,14,15,17,19,20 - eicosanedodecanol and the like, and admixtures thereof.

The poly(oxyalkylene)-polyols or polyhydroxy polyethers can be prepared by contacting a polyol of the formula $A(OH)_{x'}$, as defined above, with an epoxy-substituted hydrocarbon, as defined above, under suitable polymerization conditions, as is known to the art. For instance, glycerine can be contacted with an excess of propylene oxide (1,2-epoxypropane) under elevated pressure and in the presence of suitable polymerization promoters. Products of this type can also be obtained from commercial sources. Niax Polyol LHT-67 (a trademark) is a commercial product of this type.

Illustrative examples of the epoxy-substituted hydrocarbons of the above-defined formulas that can be employed with the polyols to form the poly(oxyalkylene)-polyols include 1,2-epoxypropane, 1,2-epoxyethane, 1,2-epoxydocosane, 10,11-epoxydocosane, 2,3 - epoxy - 4,5-dimethyldodecane, 1,3 - epoxypropane, 1,12 - epoxydodecane, 1,12-epoxy-2,11-dibutyldodecane, 1,4-epoxy-2-(2, 2-dimethyltetradecyl)butane, and the like, and admixtures thereof.

The curing or coupling agents for curable polythiol compounds which can be used to cure or couple the curable polythiol based sealant compositions of the invention include oxygen-containing substances such as, for example, air; organic peroxides and hydroperoxides such as, for example, di-tert-butyl peroxide and cumene hydroperoxide; metal oxides such as, for example, the oxides of lead, zinc, manganese, calcium, barium, copper, mercury, tin, and iron; metal salts of carboxylic acids such as, for example, lead stearate, zinc laurate, zinc acetate; ammonium persulfate; and the like, and combinations thereof. Of the above curing agents, the metal oxides are the presently preferred materials. The curing time will vary with the polythiol, the curing agent, the sealant formulation, and the temperature. In general, sufficient curing agent is employed to convert at least about 40 percent of the pendent thiol groups to polysulfide groups, when using the poly(oxyalkylene)-polyester-polythiols defined above. Generally, about 2.5 to 7.5 parts by weight of one or more such curing agents should be used according to the present invention per 100 parts by weight of liquid polythiol compound being used. With the novel sealant compositions and processes of the present invention, a strong bonding of the cured sealant composition to the substrate can be obtained in about 24 to 72 hours at room temperature.

The curable compositions of the present invention can also contain various types of inert materials commonly employed in polysulfide based sealant and caulking compositions such as fillers, plasticizers, pigments, ultraviolet light stabilizers, cure accelerators, and the like. Representative examples of the above type of compounds include calcium carbonate, titanium oxide, silica, tris-(dimethylaminomethyl)phenol, carbon black, dibutyl phthalate, chlorinated hydrocarbons, sulfur, alumina, polyethylene, polystyrene, zirconia, and the like, and combinations thereof.

It is to be understood that treating one or more substrates by means of the novel processes and/or compositions disclosed herein includes providing such substrates with protective coatings of cured compositions of the present invention and/or filling voids between and/or bonding together two or more substrates, which substrates may or may not be composed of the same material. The substrates to be thus treated include those of wood, stone and concrete, those of a siliceous nature such as glass, those of a metallic nature such as aluminum, iron, and steel as well as well as zinc and/or chrome-coated iron or steel, and synthetic polymers such as polyvinyl fluoride, polyvinyl chloride, polystyrene, and the like.

The following examples are presented in further illustration of the invention, but should not be construed in undue limitation thereof:

EXAMPLE I

A 2000 g. sample of a poly(oxyalkylene) - polyol (derived from 1,2,6-hexanetriol and propylene oxide, with a molecular weight of about 4500 and a hydroxyl number of about 34) and 198 g. of a mixture of 46.5 weight percent 3-mercaptopropionic acid, 34.8 weight percent ammonium chloride, and 18.7 weight percent thiodipropionic acid were charged to a reactor with 20 g. p-toluenesulfonic acid and 200 ml. xylene. Heat was applied for 6¼ hours and the water was azeotroped off at reflux temperature. The reaction mixture was cooled to room temperature and a slurry of 60 g. calcium hydroxide in 200 ml. xylene was added. This mixture was stirred for 30 minutes and filtered through a filter aid cake. The filtrate was treated with an additional 40 g. calcium hydroxide and after stirring for 30 minutes, the mixture was filtered again. The xylene was stripped off at reduced pressure and the residual poly(oxyalkylene)polyester-poly(monosulfide) - polythiol was isolated. The polymer product contained 0.98 weight percent thiol groups and had an acid number of 0.23 mg. of KOH per gram of sample.

The thus produced polythiol polymer was employed to make five batches (A, B, C, D and E) of sealant base in accordance with the following formulation:

| Component: | Wt. g. |
| --- | --- |
| Poly(oxyalkylene) - polyester - poly(monosulfide)polythiol | 100 |
| CaCO$_3$ | 40 |
| TiO$_2$ | 20 |
| Silica, fumed | 5 |
| Polychlorinated diphenyl | 15 |
| Sulfur | 0.05 |
| Ethylene glycol [1] | 1.37 |
| Tris - (2,4,6-dimethylaminomethyl)phenol | 1 |

[1] 1.35 grams of water was substituted for the ethylene glycol in formulation A.

The ingredients for each formulation were blended on a three-roll paint mill for approximately 5 minutes to insure proper mixing. The blended formulation was removed from the mill and admixed with the curing agent and the adhesion-promoting additive. Blending was continued by manual or mechanical stirring for approximately 5 minutes before application of the sealant. The curing agent for each formulation was 7.5 grams of an admixture consisting of 50 weight percent PbO$_2$, 45 weight percent dibutyl phthlate, and 5 weight percent stearic acid. The adhesion-promoting additive was varied as shown in Table I. A portion of each of the resulting sealant formulations was employed to form individual peel samples, each comprising a laminate of canvas, the respective sealant, and aluminum or a laminate of canvas, the respective sealant, and glass. A number of the peel samples were cured for 7 days in air at about 25° C. and then the glass-canvas peel and the aluminum-canvas peel values were determined. The remainder of the peel samples were cured for 7 days in air at about 25° C. and then were fully immersed in water at about 25° C. for 7 days. The glass-canvas peel value and the aluminum-canvas peel values were measured at the end of the 14 days. The adhesion-promoting additive and the corresponding peel values are shown in Table I:

uct of water and gamma-glycidoxypropyltrimethoxysilane with the molar ratio of water to silane being 2:1. Different amounts of the entire reaction effluent were employed in the runs as the adhesion-promoting agent. The sealant formulations were employed to make individual peel samples of a laminate of canvas, the respective sealant, and glass or a laminate of canvas, the respective

TABLE I

| Formulation | Adhesion promoter | | Glass-canvas peel strength [3] | | Aluminum-canvas peel strength [3] | |
|---|---|---|---|---|---|---|
| | Silane,[1] g. | Reaction product [2] of silane [1] and water, g. | 7 days | 14 days | 7 days | 14 days |
| A [4] | 3 | | 9 | 8.5 | 9 | 8.5 |
| B | | 2.79  0.21 | 11 | 12.5 | 11 | 12.7 |
| C | | 2.60  0.40 | 19 | 19 | 21 | 21 |
| D | | 3.01  0.69 | 18 | 18 | 20 | 18.2 |
| E | | 3.02  1.38 | 18 | 18.5 | 18 | 19 |

[1] Unhydrolyzed gamma-glycidoxypropyltrimethoxysilane.
[2] The indicated amounts of the silane and water were admixed in a container and agitated for approximately 10–45 minutes at a temperature of approximately 25° C. The homogeneous reaction effluent was employed as the adhesion promoter.
[3] Pounds per inch width, the canvas being peeled from the other substrate at a 180° angle.
[4] The sealant base contained 1.35 grams of water incorporated therein prior to the addition of the silane to the formulation.

The operability of the present invention is demonstrated by the data of Table I. Formulation A is a control run containing unhydrolyzed gamma - glycidoxypropyltrimethoxysilane. Formulations B through E are runs in accordance with the invention in which the above-mentioned silane was hydrolyzed before incorporation into the uncured sealant recipe. In runs B through E, the molar ratio of water to silane used for the hydrolysis was 1:1, 2:1, 3:1, and 6:1, respectively. The glass-canvas peel and aluminum-canvas peel data in Table I demonstrate the superior adhesive quality of the inventive runs B through E over control run A. A comparison of Runs A and E establishes the significant improvement achieved by reacting the silane and water prior to incorporation into the sealant base (Run E) over the separate incorporation of the same amounts of silane and water into the sealant base. A comparison of Runs B, C, D and E reveals that the peel strength of the cured adhesive increases significantly with an increase in the mole ratio of water to silane from 1:1 to 2:1, but a further increase in the molar ratio is not accompanied by any significant increase in peel strength. In each of the runs, the bond failure occurred at the canvas to sealant interface, indicating that the adhesion at the glass-sealant interface or the aluminum-sealant interface was greater than the cited values in Table I.

EXAMPLE II

Polythiol polymer produced in accordance with Example I was employed to make batches of sealant base in accordance with the following formulation:

Component: Wt. g.
Poly(oxyalkylene)-polyester - poly(monosulfide) polythiol _____ 100
CaCO$_3$ _____ 40
TiO$_2$ _____ 20
Silica, fumed _____ 5
Polychlorinated diphenyl _____ 15
Sulfur _____ 0.05
Ethylene glycol _____ 1.37

These ingredients were blended on a three-roll paint mill for approximately 5 minutes and then the curing agent and the adhesion-promoting additive were incorporated and the blending was continued for approximately 5 minutes. The curing agent consisted of 4.5 grams of the admixture of 50 weight percent PbO$_2$, 45 weight percent dibutyl phthalate, and 5 weight percent stearic acid. Each of the adhesion-promoting additives was the reaction prodsealant, and aluminum. The peel samples were aged in air for 7 days at about 25° C. and then the peel strength values were determined. The results are set forth in the following table:

TABLE II

| Run | F | G | H |
|---|---|---|---|
| Silane-water reaction product, grams | 3.0 | 2.0 | 1.0 |
| Glass-canvas peel strength,[1] p.p.i.w. | 12–35 | 25–32 | 30–35 |
| Aluminum-canvas peel strength,[1] p.p.i.w. | 12.5–15 | 20 | 20 |

[1] Range of values for describing peel samples was necessitated by the sample failure occurring over the indicated range rather than being a sharp separation.

The data of Table II demonstrate that the formulations containing the pre-hydrolyzed silanes achieve satisfactory peel strength values even with less curing agent than employed in the runs of Table I and even at lower amounts of the hydrolyzed silane.

EXAMPLE III

A sealant base was prepared in accordance with the following formulation:

Component: Wt. g.
Poly(oxyalkylene) - polyester-poly(monosulfide)- polythiol _____ 500
TiO$_2$ _____ 100
CaCO$_3$ _____ 200
Polychlorinated diphenyl _____ 75
Sulfur _____ 0.25
Antioxidant _____ 5
Fumed silica _____ 30

These ingredients were blended on a three-roll paint mill for approximately 5 minutes. A 350-gram portion of this sealant base was admixed for approximately 5 minutes with 11.52 grams of a curing agent, 1.93 grams of an adhesion-promoting agent and 4.38 grams of water before application. The curing agent consisted of 50 weight percent PbO$_2$, 45 weight percent dibutyl phthalate and 5 weight percent stearic acid. The adhesion-promoting agent was the reaction product of water and gamma-glycidoxypropyltrimethoxysilane having a molar ratio of water to silane of 2:1, i.e., 0.21 gram of water and 2.79 grams of the silane. The resulting sealant was employed to make peel samples in the form of a laminate of canvas/sealant/ glass or a laminate of canvas/sealant/aluminum. Some of the peel samples were cured for 7 days in air at about 25° C. and then the peel strengths were measured. The other peel samples were cured for 7 days in air at about 25° C.

and then immersed in water at about 25° C. for 7 days. The results are set forth in the following table:

TABLE III

| | Col. 1 | Col. 2 |
|---|---|---|
| Aluminum-canvas | (Adhesive 6–11 failure to Al) {22.5 canvas peel, 35 cohesive failure} | |
| Glass-canvas | {22 (canvas peel), 39 (cohesive failure)} | 20 canvas peel |

These data show the excellent adhesion quality of the cured sealants. It is to be noted that the inclusion of water or ethylene glycol in these sealant formulations imparts a gel-like consistency to the uncured sealant rendering it suitable for use in vertical joints since the sealant will not run out before curing takes place.

Reasonable variations and modifications are possible within the scope of the foregoing disclosure and the appended claims to the invention.

That which is claimed is:

1. A method for improving the adhesive characteristics of a liquid polythiol based sealant to substrates which comprises contacting water and at least one glycidyl trialkyloxysilane having the formula

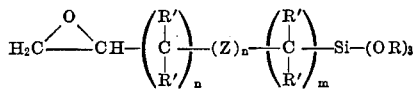

wherein Z is an oxygen atom or a sulfur atom, $n$ is an integer in the range of 1 to 5, $m$ is an integer in the range of 1 to 5, $x$ is zero or 1, each R' is individually selected from the group consisting of hydrogen and alkyl radicals having from 1 to 5 carbon atoms, the total carbon atoms in all R' groups per molecule being equal to or less than 10, and wherein each R is individually selected from alkyl radicals having from 1 to 5 carbon atoms; under suitable conditions to at least partially hydrolyze said glycidyl trialkyloxysilane; and admixing the resulting at least partially hydrolyzed glycidyl trialkyloxysilane and a curing agent into a liquid polythiol having at least about 2 to about 40 pendent reactive thiol groups per molecule, the amount of said glycidyl trialkyloxysilane added being in the range of about 0.1 part to about 10 parts by weight per hundred parts by weight of said liquid polythiol and the amount of said curing agent added being sufficient to convert at least about 40 weight percent of the pendent reactive thiol groups to polysulfide groups.

2. A method in accordance with claim 1 wherein the molar ratio of water to said at least one glycidyl trialkyloxysilane in said step of contacting is at least about 1:1.

3. A method in accordance with claim 2 wherein the molar ratio is in the range of about 1.5:1 to about 2:1.

4. A method in accordance with claim 1 wherein the at least partially hydrolyzed glycidyl trialklyoxysilane is represented by the formula

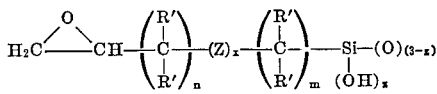

wherein $m$, $n$, $x$, R', R and Z are as defined in claim 1, and $z$ is a number in the range of 1.0 to 3.0, on a statistical basis.

5. A method in accordance with claim 4 wherein $z$ is a number in the range of about 1.5 to about 2.0.

6. A method in accordance with claim 5 wherein the at least partially hydrolyzed glycidyl trialkyloxysilane is admixed with said liquid polythiol in an amount in the range of about 0.2 part to about 6 parts by weight per 100 parts by weight of said liquid polythiol.

7. A method in accordance with claim 1 wherein the entire reaction effluent obtained from the step of contacting is incorporated into said liquid polythiol.

8. A method in accordance with claim 1 wherein said liquid polythiol is a poly(oxyalkylene)-polyester-poly(monosulfide)-polythiol having at least three pendent thiol groups per molecule formed by the reaction of a mercaptoalkanoic acid and a thiodialkanoic acid with a poly(oxyalkylene)-polyol having at least three pendent hydroxy groups per molecule.

9. A method in accordance with claim 8 wherein the at least partially hydrolyzed glycidyl trialkyloxysilane is represented by the formula

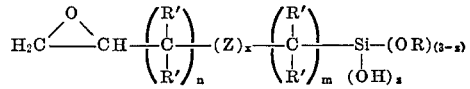

wherein $m$, $n$, $x$, R', R and Z are as defined in claim 1, and $z$ is a number in the range of 1.0 to 3.0, on a statistical basis.

10. A method in accordance with claim 9 wherein said glycidyl trialkyloxysilane is gamma-glycidoxypropyltrimethoxysilane.

11. A method in accordance with claim 10 wherein $z$ is a number in the range of about 1.5 to about 2.0, wherein the entire reaction effluent obtained from the step of contacting is incorporated into said liquid polythiol in an amount in the range of about 0.1 part to about 10 parts by weight per 100 parts by weight of said liquid polythiol.

12. A method in accordance with claim 1, further comprising applying the resulting composition to a substrate.

13. A method in accordance with claim 1 further comprising admixing ethylene glycol or water into said liquid polythiol.

14. A curable sealant composition comprising, in weight ratio:
(a) 100 parts by weight of a curable liquid polythiol having at least about 2 to about 40 pendent reactive thiol groups per molecule,
(b) from 0.1 to 10 parts by weight of at least one at least partially hydrolyzed glycidyl trialkyloxysilane having the formula

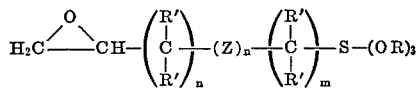

wherein Z is an oxygen atom or a sulfur atom, $n$ is an integer in the range of 1 to 5, $m$ is an integer in the range of 1 to 5, $x$ is zero or 1, each R' is individually selected from the group consisting of hydrogen and alkyl radicals having from 1 to 5 carbon atoms, the total carbon atoms in all R' groups per molecule being equal to or less than 10, and wherein each R is individually selected from alkyl radicals having from 1 to 5 carbon atoms; and
(c) at least one curing agent present in an amount sufficient to convert at least about 40 weight percent of the pendent reactive thiol groups to polysulfide groups.

15. A composition according to claim 14 wherein the polythiol is a poly(oxyalkylene)-polyester-poly(monosulfide)-polythiol having at least three pendent thiol groups per molecule formed by the reaction of a mercaptoalkanoic acid and a thiodialkanoic acid with a poly(oxyalkylene)-polyol having at least three pendent hydroxy groups per molecule, and wherein said hydrolyzed silane is hydrolyzed to the extent that at least one-third of the alkyloxy groups in said silane are converted to —OH groups.

16. A composition according to claim 15 wherein said glycidyl trialkyloxysilane is gamma-glycidoxypropyltrimethoxysilane and the curing agent is lead peroxide, the amount of curing agent present being in the range of 2.5 to 7.5 weight parts per 100 weight parts of polythiol.

17. A composition according to claim 15 which additionally contains ethylene glycol.

18. An article of manufacture which is a substrate having on at least one surface thereof a layer, exhibiting a high peel strength bonded thereto, of the sealant composition of claim 14.

19. An article of manufacture which is a substrate having on at least one surface thereof a layer, exhibiting a high peel strength bonded thereto, of the sealant composition of claim 15.

20. An article as defined in claim 19 in which said substrate is glass or aluminum.

21. An article as defined in claim 20 wherein said polythiol is a poly(oxyalkylene)-polyester-poly(monosulfide)-polythiol having at least three pendent thiol groups per molecule formed by the reaction of a mercaptoalkanoic acid and a thiodialkanoic acid with a poly(oxyalkylene)-polyol having at last three pendent hydroxy groups per molecule, said glycidyl trialkyloxysilane is gamma-glycidoxypropyltrimethoxysilane, and the curing agent is lead peroxide.

References Cited
UNITED STATES PATENTS

| | | | |
|---|---|---|---|
| 3,317,461 | 5/1967 | Plueddemann | 260—79 |
| 3,312,669 | 4/1967 | Giordano | 260—79 |
| 3,717,617 | 2/1973 | Marrs et al. | 260—79 |
| 3,476,826 | 11/1969 | Millen. | |

WILBERT J. BRIGGS, SR., Primary Examiner

U.S. Cl. X.R.

117—124 E, 124 F, 132 B, 132 BS; 260—29.2 E, 29.2 EP, 33.4 R, 33.4 SB, 75 S, 79, 824 R

UNITED STATES PATENT OFFICE
CERTIFICATE OF CORRECTION

Patent No. 3,798,192                    Dated March 19, 1974

Inventor(s)   Joseph R. Kenton

It is certified that error appears in the above-identified patent and that said Letters Patent are hereby corrected as shown below:

Column 9, lines 24 to 27, the formula should appear as shown below:

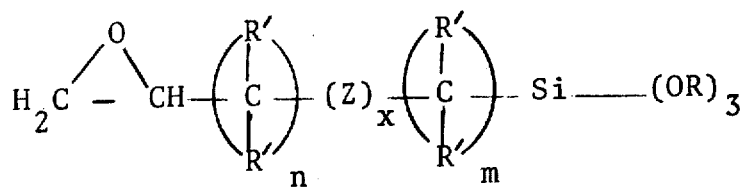

Column 9, line 58, "$(O)_{(3-z)}$" should read -- $(OR)_{(3-z)}$ --.

Column 10, lines 40 to 43, the formula should appear as shown below:

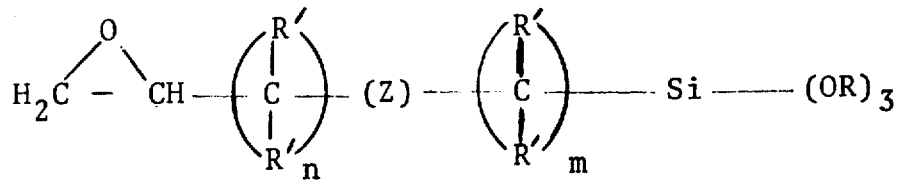

Signed and sealed this 20th day of August 1974.

(SEAL)
Attest:

McCOY M. GIBSON, JR.                    C. MARSHALL DANN
Attesting Officer                       Commissioner of Patents